United States Patent [19]

Guo

[11] Patent Number: 5,886,114
[45] Date of Patent: Mar. 23, 1999

[54] PROCESS FOR MAKING VINYL AROMATIC/ALLYL ALCOHOL COPOLYMERS

[75] Inventor: Shao-Hua Guo, West Goshen, Pa.

[73] Assignee: Arco Chemical Technology, L.P., Greenville, Del.

[21] Appl. No.: 888,489

[22] Filed: Jul. 8, 1997

Related U.S. Application Data

[63] Continuation-in-part of Ser. No. 734,284, Oct. 21, 1996, abandoned.

[51] Int. Cl.$^6$ .......................... C08F 216/08; C08F 212/08
[52] U.S. Cl. ............................. 526/86; 526/87; 526/227; 526/230; 526/232; 526/332; 526/333; 526/347
[58] Field of Search ................................ 526/86, 87, 227, 526/232, 293, 347, 332, 333, 230

[56] References Cited

U.S. PATENT DOCUMENTS

| | | | |
|---|---|---|---|
| 2,630,430 | 3/1953 | Shokal et al. ......................... | 260/88.1 |
| 2,894,938 | 7/1959 | Chapin et al. ......................... | 260/88.1 |
| 2,940,946 | 6/1960 | Shokal et al. ......................... | 260/23 |
| 3,268,561 | 8/1966 | Peppel et al. ......................... | 260/348 |
| 4,618,703 | 10/1986 | Thanawalla et al. .................. | 560/209 |
| 5,382,642 | 1/1995 | Guo ....................................... | 526/333 |
| 5,444,141 | 8/1995 | Guo ....................................... | 526/347 |

*Primary Examiner*—Fred Teskin
*Attorney, Agent, or Firm*—Jonathan L. Schuchardt

[57] ABSTRACT

An improved process for making vinyl aromatic/allylic alcohol copolymers is disclosed. Gradual addition of a free-radical initiator during the course of the polymerization results in a substantial increase in the polymer yield obtained compared with the yield from conventional processes in which all of the free-radical initiator is charged initially. High yields are obtained when the monomer mole ratios are adjusted to produce styrene-allyl alcohol copolymers having a hydroxyl number in the 50–150 mg KOH/g range. Copolymers made by the process are valuable coating resins.

10 Claims, No Drawings

PROCESS FOR MAKING VINYL AROMATIC/ALLYL ALCOHOL COPOLYMERS

CROSS-REFERENCE TO RELATED APPLICATION

This application is a continuation-in-part of application Ser. No. 08/734,284, filed Oct. 21, 1996, now abandoned.

FIELD OF THE INVENTION

The invention relates to vinyl aromatic/allylic alcohol copolymers such as styrene-allyl alcohol copolymers. In particular, the invention is an improved process that gives high yields of these copolymers, which are especially valuable as hydroxy-functional resins in the coatings industry.

BACKGROUND OF THE INVENTION

Vinyl aromatic/allylic alcohol copolymers are well known (see U.S. Pat. Nos. 2,630,430, 2,894,938, and 2,940,946). Copolymers of styrene and allyl alcohol (SAA copolymers) are resinous polyols that are particularly useful for polyesters, fatty ester emulsions, alkyd and uralkyd coatings, melamines, and polyurethanes. Styrene-allyl alcohol copolymers can be made in a batch process by charging a reactor with styrene, allyl alcohol, and a free-radical initiator, and heating the mixture at a temperature effective to polymerize the monomers (usually 100°–300° C.).

While SAA copolymers having relatively low hydroxyl contents (hydroxyl number=50 to 150 mg KOH/g) are known (see, e.g., U.S. Pat. No. 2,894,938, Example 1), the utility of these polymers was previously thought to be rather limited (see U.S. Pat. Nos. 5,444,141 and 2,940,946). Those skilled in the art believed that a higher concentration of SAA hydroxyl groups was needed for sufficient crosslinking and good coating properties.

We recently described a process for making vinyl aromatic/allylic alcohol copolymers (U.S. Pat. No. 5,444,141). The process is well-suited for making SAA copolymers having hydroxyl numbers within the range of about 180 to 280 mg KOH/g, the range generally recognized as commercially valuable. Commercially available resins include "SAA 100" (hydroxyl number=200 mg KOH/g) and "SAA 101" (hydroxyl number=260 mg KOH/g) resinous polyols. We demonstrated that yields of these SAA copolymers improve significantly when the free-radical initiator is gradually added to the reaction mixture. We reported polymer yields of 30–40% for products having hydroxyl numbers of 180–280 mg KOH/g.

In U.S. Pat. No. 5,444,141, we said that the yield of SAA copolymer can be increased, "but only at the expense of making a product having higher styrene content, lower hydroxyl number, etc., a product that lacks utility for most of the targeted end-use applications."

For some coating applications, however, hydroxy-functional resins with lower hydroxyl numbers are actually an advantage. Some coating components are incompatible with SAA copolymers that have a high content of hydroxyl groups. Low hydroxyl content can also be an advantage in reducing the amount of relatively expensive crosslinking agent (e.g., polyisocyanate) required.

In sum, an improved process for making vinyl aromatic/allylic alcohol copolymers, especially styrene-allyl alcohol copolymers, is needed. Coating applications that could benefit from a low hydroxyl group content resin are evolving, and suitable resins are needed for these applications. A process for making the resins is therefore also of interest. Preferably, the process would be easy to perform, would use conventional equipment, and would be cost-effective. A preferred process would give favorable yields of SAA copolymers having hydroxyl numbers within the 50 to 150 mg KOH/g range.

SUMMARY OF THE INVENTION

The invention is a semi-batch process for making vinyl aromatic/allylic alcohol copolymers. The process comprises charging a reactor with an allylic alcohol, 10–30% of the total amount to be used of a vinyl aromatic monomer, and 45–75% of the total amount to be used of a free-radical initiator. The mixture is heated at a temperature within the range of about 125° C. to about 185° C. The remaining 70–90% of the vinyl aromatic monomer and 25–55% of the free-radical initiator are added gradually to the reaction mixture at a decreasing rate. The mole ratio of vinyl aromatic monomer to allylic alcohol used in the process is within the range of about 0.6 to about 5.

The resulting product is a vinyl aromatic/allylic alcohol copolymer having a number average molecular weight within the range of about 2000 to about 10,000 and a hydroxyl number within the range of about 50 mg KOH/g to about 150 mg KOH/g.

I surprisingly found that selection of these conditions, which include a gradual addition of the free-radical initiator during the course of the polymerization, results in a substantial increase in the yield of vinyl aromatic/allylic alcohol copolymer compared with the yield obtained from a conventional process in which all of the free-radical initiator is charged initially to the reactor. The mole ratio of vinyl aromatic monomer to allylic alcohol used in the process is adjusted in a manner effective to give products having the required hydroxyl numbers and number average molecular weights.

Copolymers prepared by the process are valuable for polyesters, fatty ester emulsions, alkyd and uralkyd coatings, melamines, and polyurethanes. These coating systems have many end uses, including, e.g., wood finishes, industrial coatings, and automotive coatings. The process of the invention is well-suited for the manufacture of SAA copolymers having relatively low hydroxyl content, copolymers which are gaining acceptance in the coatings industry because of the compatibility or cost advantages they offer.

DETAILED DESCRIPTION OF THE INVENTION

The invention is a semi-batch process for making copolymers derived from vinyl aromatic monomers and allylic alcohols.

Vinyl aromatic monomers useful in the invention are aromatic compounds that have a —CH=CH$_2$ group attached to an aromatic ring. Suitable vinyl aromatic monomers include, but are not limited to, styrene, alkyl-substituted styrenes (e.g., 4-methylstyrene, 4-tert-butylstyrene,2,6-dimethylstyrene), halogenated styrenes (e.g., 4-chlorostyrene, dichlorostyrenes, dibromostyrenes, tribromostyrenes), vinyl naphthalenes, and the like, and mixtures thereof. A minor proportion of a di- or polyvinyl aromatic monomer such as divinylbenzene can be included if a greater degree of crosslinking is desired, although preferably only a monovinyl aromatic monomer is used. Styrene and halogenated styrenes are preferred vinyl aromatic monomers.

An allylic alcohol is also used in the process. Preferred allylic alcohols have the general structure CH$_2$=CR—

$CH_2$—OH, in which R is hydrogen or a $C_1$–$C_{10}$ alkyl group. Suitable allylic alcohols include, for example, allyl alcohol, methallyl alcohol, 2-ethyl-2-propen-1-ol, 2-pentyl-2-propen-1-ol, and the like, and mixtures thereof. Allyl alcohol and methallyl alcohol are particularly preferred.

Suitable allylic alcohols also include alkoxylated allylic alcohols of the formula $CH_2$=$CR'$—$CH_2$—$(A)_n$—OH in which R' is hydrogen or methyl, A is a $C_2$–$C_4$ oxyalkylene group, and n, which is the average number of oxyalkylene units in the alkoxylated allylic alcohol, has a value within the range of about 1 to about 5. Suitable propoxylated allyl alcohols can be made, for example, by reacting allyl alcohol with up to 5 equivalents of propylene oxide in the presence of a basic catalyst, as is described in U.S. Pat. Nos. 3,268,561 and 4,618,703, the teachings of which are incorporated herein by reference. Particularly preferred are propoxylated allyl alcohols for which n has a value within the range of about 1 to about 2.

The mole ratio of vinyl aromatic monomer to allylic alcohol used in the process is important. It is adjusted to give copolymer products having the desired hydroxyl numbers and number average molecular weights. In contrast to the process of U.S. Pat. No. 5,444,141, the mole ratio of vinyl aromatic monomer to allylic alcohol in the process of the invention is maintained within the range of about 0.6 to about 5. A more preferred range is from about 0.6 to about 2; most preferred is the range from about 0.7 to about 1.2. An excess of vinyl aromatic monomer may be present in the monomer feed; however, an excess of the allylic alcohol is still normally present in the reaction mixture because of the relatively low reactivity of the allylic alcohol and because of the gradual monomer addition.

A free-radical initiator is included in the process of the invention. Suitable free-radical initiators are the peroxide and azo-type initiators well known to those skilled in the art. High-temperature peroxide initiators are preferred. Examples include di-tert-butylperoxide, tert-butylhydroperoxide, tert-butylperbenzoate, cumene hydroperoxide, and the like.

The free-radical initiator is used in an amount effective to copolymerize the vinyl aromatic monomer and allylic alcohol. The actual amount used varies depending upon many factors, including which free-radical initiator is used, which monomers are present, reaction temperature, desired reaction time, the desired molecular weight and functionality of the polymer, and other factors. Generally, the total amount of free-radical initiator used is greater than about 1 wt. % based on the total weight of monomers. Preferably, an amount within the range of about 2 wt. % to about 25 wt. % based on the total weight of monomers is used; a more preferred range is from about 3 wt. % to about 15 wt. %.

Generally, the process of the invention is practiced as follows. A reactor is first charged with the allylic alcohol (preferably allyl alcohol), 10–30% (preferably 20–25%) of the total amount to be used of the vinyl aromatic monomer (preferably styrene), and 45–75% (preferably 60–70%) of the total amount to be used of the free-radical initiator. The mixture is heated at a temperature within the range of about 125° C. to about 185° C., preferably from about 135° C. to about 165° C. The remaining 70–90% (preferably 75–80%) of vinyl aromatic monomer and 25–55% (preferably 30–40%) of free-radical initiator are then gradually added to the reaction mixture at a decreasing rate while polymerization proceeds. The manner in which the vinyl aromatic monomer and free-radical initiator are introduced is not critical. Thus, for example, the vinyl aromatic monomer and free-radical initiator can be added to the reactor separately, or the two can be mixed just prior to the reaction and added as a single stream. For safety reasons, particularly in large-scale reactions, it is preferred to add the vinyl aromatic monomer and free-radical initiator separately.

The mole ratio of vinyl aromatic monomer to allylic alcohol is adjusted within the range of about 0.6 to about 5 in a manner effective to produce a copolymer having the desired hydroxyl number and number average molecular weight. The resulting vinyl aromatic/allylic alcohol copolymer has a number average molecular weight within the range of about 2000 to about 10,000 and a hydroxyl number within the range of about 50 mg KOH/g to about 150 mg KOH/g. More preferred copolymers have number average molecular weights within the range of about 2,000 to about 4000, and hydroxyl numbers within the range of about 105 mg KOH/g to about 145 mg KOH/g. Gradual addition of the free-radical initiator results in an enhanced yield of the copolymer.

The process of the invention is well-suited to the preparation of styrene-allyl alcohol (SAA) copolymers that have relatively low hydroxyl group contents, i.e., those having hydroxyl numbers within the range of about 50 mg KOH/g to about 150 mg KOH/g. In many ways, the process resembles the one we described in U.S. Pat. No. 5,444,141 (the teachings of which are incorporated herein by reference) for making "SAA 100" and "SAA 101" resinous polyols. The key difference is adjustment of the mole ratio of vinyl aromatic monomer to allylic alcohol to give a product having the desired hydroxyl number and number average molecular weight.

A conventional process for making SAA copolymers involves gradually adding styrene at a decreasing rate to a reaction mixture that contains allyl alcohol and a peroxide initiator (see Example I, U.S. Pat. No. 2,940,946). All of the peroxide initiator is normally charged to the reactor at the start of the polymerization, and the polymer yield is typically 20% ("SAA 101" product) to 30% ("SAA 100" product). The expected yield of a low hydroxyl content resin made by the conventional process, based on the results reported in U.S. Pat. No. 5,444,141, is 45 to 50% or less.

I unexpectedly found that the yield of vinyl aromatic/allylic alcohol copolymers improves substantially if both the vinyl aromatic monomer and the free-radical initiator are added gradually at a decreasing rate to the reaction mixture. When the process of the invention is used to make an SAA resinous polyol having a hydroxyl number in the range of about 50 to 150 mg KOH/g, the yield of copolymer is about 67% (see Example 1 below), which is significantly higher than the yield expected from the conventional process in which all of the free-radical initiator is charged to the reactor initially. This substantial yield improvement makes the process much more economically attractive.

In U.S. Pat. No. 5,444,141 ("the '141 patent"), we explained that the mole ratio of styrene to allyl alcohol is adjusted to make "SAA 100" and "SAA 101" resinous polyols by the process of that invention. To make low hydroxyl content SAA resinous polyols by the process of the present invention, the mole ratio of styrene to allyl alcohol should be within the range of about 0.6 to about 5, preferably within the range of about 0.6 to about 2, and most preferably from about 0.7 to about 1.2. While the process of the invention resembles the process described in the '141 patent except for adjusting the styrene to allyl alcohol ratio, the reference teaches that high-styrene, low OH-content products such as those made by the process of the invention are not particularly useful in the industry.

The invention allows significantly higher yields (typically 30–50% higher) of styrene-allyl alcohol copolymers than were available from conventional processes in which all of the free-radical initiator is charged to the reactor at the start of the polymerization. The yield increases mean higher operating efficiency, less unreacted monomer to recover and recycle, and more product from each cycle. Importantly, the process increases yields without adversely affecting the copolymer structure, molecular weight, or hydroxyl functionality: the products obtained meet the target specifications for a variety of end uses.

The vinyl aromatic/allylic alcohol copolymers made by the process of the invention are useful intermediates for preparing a variety of derivatives. Copolymers made using the process of the invention can be used in alkyd resins. The copolymer, optionally combined with glycerin or another polyol, is partially or fully esterified with a fatty acid to give an alkyd resin. In addition, the copolymers are useful in uralkyd compositions, melamine-based coatings, polyurethanes, and unsaturated polyester resins. Each of these applications is described in more detail in U.S. Pat. No. 5,382,642, the teachings of which are incorporated herein by reference. Copolymers made by the process of the invention are valuable for many end uses, including, e.g., wood finishes, industrial coatings, and automotive coatings.

Copolymers made by the process of the invention offer solubility advantages over other SAA copolymers. As Example 5 below shows, relatively low hydroxyl group content SAA resinous polyols are much more soluble in aromatic hydrocarbons than commercially available "SAA 100" and "SAA 101" resinous polyols. Aromatic hydrocarbons are commonly used in many coating applications. The process of the invention therefore provides a convenient way to make SAA copolymers that are useful in coatings that use aromatic hydrocarbons.

For many coating applications, hydroxy-functional resins with low hydroxyl numbers are an advantage. Some coating components are incompatible with SAA copolymers that have a high content of hydroxyl groups. As Example 6 shows, a two-component polyurethane coating based on AIRTHANE ASN-540M NCO-terminated polyester prepolymer (product of Air Products) and a low hydroxyl content SAA copolymer made by the process of the invention has excellent properties. In contrast, however, as Comparative Example 7 shows, an "SAA 100" resinous polyol is not compatible with the prepolymer, and a satisfactory coating cannot be made.

Copolymers made by the process of the invention also offer a potential cost advantage. Usually, the crosslinker is the most expensive coating component. Because the copolymers of the invention have relatively low hydroxyl numbers, they require reduced proportions of expensive crosslinkers such as polyisocyanates or melamines. Thus, the cost of the formulation is reduced if an SAA resinous polyol having a relatively low hydroxyl content can be used.

The following examples merely illustrate the invention. Those skilled in the art will recognize many variations that are within the spirit of the invention and scope of the claims.

EXAMPLE 1

Preparation of a Styrene-Allyl Alcohol Copolymer (number average mol. wt. about 3500, hydroxyl number about 125 mg KOH/g)

Gradual addition of Di-tert-butylperoxide

Allyl alcohol (1000 g), styrene (353 g), and di-tert-butylperoxide (76 g) are charged to a five-liter stainless-steel reactor equipped with addition pumps for monomer and initiator, agitator, oil heating jacket, temperature controller, and inlets for nitrogen or vacuum. After purging three times with nitrogen, the reactor is sealed, and the contents are heated to 145° C. Styrene (1225 g) is charged to the monomer addition pump; di-tert-butylperoxide (35.8 g) is charged to the initiator addition pump. Styrene and di-tert-butylperoxide are added gradually to the reactor over 7 h at 145° C. at a decreasing rate. The mole ratio of styrene to allyl alcohol used is 0.88.

The addition rates are as follows. For styrene: 246 g/h for the first hour, 235 g/h for the second hour, 207 g/h for the third hour, 179 g/h for the fourth hour, 150 g/h for the fifth hour, 129 g/h for the sixth hour, and 89 g/h for the seventh hour. For di-tert-butylperoxide: 8.0 g/h for the first hour, 6.5 g/h for the second hour, 6.0 g/h for the third hour, 5.0 g/h for the fourth hour, 4.5 g/h for the fifth hour, 3.5 g/h for the sixth hour, and 2.5 g/h for the seventh hour.

Heating continues at 145° C. for an additional 0.5 h. Unreacted monomers are removed from the product by vacuum distillation. The last traces of unreacted monomers are removed by addition of water and stripping under vacuum. The product, 1492 g of a styrene-allyl alcohol copolymer (67% yield based on the total weight of monomers), is isolated and characterized (hydroxyl number=124 mg KOH/g; Mn=3400; Mw=9090).

COMPARATIVE EXAMPLE 2

Preparation of a Styrene-Allyl Alcohol Copolymer (number average mol. wt. about 1500, hydroxyl number about 200 mg KOH/g)

Gradual addition of Di-tert-butylperoxide ("SAA 100" copolymer)

Allyl alcohol (500 g), styrene (67 g), and di-tert-butylperoxide (16 g) are charged to a one-liter stainless-steel reactor equipped with addition pump, agitator, steam heating jacket, temperature controller, and inlets for nitrogen or vacuum. After purging three times with nitrogen, the reactor is sealed, and the contents are heated to 145° C. Di-tert-butylperoxide (8 g) is mixed with styrene (234 g), and this mixture is pumped into the reactor over 7 h at 145° C. at a decreasing rate. The mole ratio of styrene to allyl alcohol used is 0.34.

The addition rates are as follows: 50 g/h for the first hour, 45 g/h for the second hour, 40 g/h for the third hour, 35 g/h for the fourth hour, 30 g/h for the fifth hour, 24 g/h for the sixth hour, and 18 g/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 322 g of a styrene-allyl alcohol copolymer (40% yield based on the total weight of monomers), is isolated and characterized (hydroxyl number=199 mg KOH/g; Mn=1500; Mw=3400).

COMPARATIVE EXAMPLE 3

Preparation of a Styrene-Allyl Alcohol Copolymer (number average mol. wt. about 1500, hydroxyl number about 200 mg KOH/g)

All of the Di-tert-butylperoxide Charged at the Start of the Polymerization ("SAA 100" copolymer)

Allyl alcohol (500 g), styrene (67 g), and di-tert-butylperoxide (16 g) are charged to a one-liter stainless-steel reactor equipped as in Example 1. After purging three times with nitrogen, the reactor is sealed, and the contents are heated to 135° C. Styrene (134 g) is pumped into the reactor over 5 h at 135° C. at a decreasing rate. The mole ratio of styrene to allyl alcohol used is 0.22.

The addition rates are as follows: 48 g/h for the first hour, 32 g/h for the second hour, 24 g/h for the third hour, 18 g/h for the fourth hour, and 12 g/h for the fifth hour. Heating continues at 135° C. for an additional 0.5 h.

Unreacted monomers are removed from the product by vacuum distillation. The last traces of unreacted monomers are removed by addition of water and stripping under vacuum. The product, 208 g of a styrene-allyl alcohol copolymer (30% yield based on the total weight of monomers), is isolated and characterized (hydroxyl number=195 mg KOH/g; Mn=1430; Mw=3400).

Comparative Examples 2 and 3 show that a 33% increase in yield (from about 30% to 40%) is available from a process in which the di-tert-butylperoxide is added gradually during the course of the polymerization (Comparative Example 2) compared with the process in which all of the free-radical initiator is charged at the start of the polymerization (Comparative Example 3). The target in both comparative examples is an "SAA 100" product, i.e., a styrene-allyl alcohol copolymer having a hydroxyl number of about 200 mg KOH/g, and a number average molecular weight of about 1500.

COMPARATIVE EXAMPLE 4

Preparation of a Styrene-Allyl Alcohol Copolymer (number average mol. wt. about 1200, hydroxyl number about 260 mg KOH/g)

Gradual addition of Di-tert-butylperoxide ("SAA 101" copolymer)

Allyl alcohol (500 g), styrene (43 g), and di-tert-butylperoxide (12 g) are charged to a one-liter stainless-steel reactor equipped as in Example 1. After purging three times with nitrogen, the reactor is sealed, and the contents are heated to 145° C. Di-tert-butylperoxide (6 g) is mixed with styrene (151 g), and this mixture is pumped into the reactor over 7 h at 145° C. at a decreasing rate. The mole ratio of styrene to allyl alcohol used is 0.22.

The addition rates are as follows: 34 g/h for the first hour, 29 g/h for the second hour, 26 g/h for the third hour, 23 g/h for the fourth hour, 19 g/h for the fifth hour, 15 g/h for the sixth hour, and 11 g/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 209 g of a styrene-allyl alcohol copolymer (30% yield based on the total weight of monomers), is isolated and characterized (hydroxyl number=251 mg KOH/g; Mn=1100; Mw=2260).

Example 1 and Comparative Examples 2–4 show that gradual addition of the free-radical initiator generally improves yield (Comparative Examples 2 and 3), and that a high yield of copolymer (67%) is available from the gradual addition process when the target is a styrene-allyl alcohol copolymer having a hydroxyl number within the range of about 50 to about 150 mg KOH/g.

EXAMPLE 5

Solubility Comparison

The SAA resinous polyol made by the process of Example 1 is dissolved in xylenes or AROMATIC 100 solvent (product of Exxon Chemical) to give a 50 wt. % solids solution. Both solutions are clear; the resinous polyol is completely soluble in these aromatic hydrocarbons. In contrast, both "SAA 100" and "SAA 101" resinous polyols form very cloudy mixtures when combined in the same manner, indicating that these commercially available resinous polyols are not completely soluble in aromatic hydrocarbons.

EXAMPLE 6

Preparation of a Two-Component Polyurethane Clear Coating

Part A of the clearcoat consists of a mixture of the SAA copolymer of Example 1 (892.5 g of 70% solution in propylene glycol methyl ether acetate), methyl isobutyl ketone (125 g), BYK 300 silicone surface additive (1.49 g, product of BYK Chemie), and METACURE T-120 catalyst (0.75 g, product of Air Products). Part of this mixture (100 g) is diluted with more methyl isobutyl ketone (40 g), and this solution is then mixed with Part B, which is AIRTHANE ASN-540M NCO-terminated polyester prepolymer (88.8 g).

The clearcoat solution is clear and has a viscosity of 68 s (EZ Cup #2). It has a pot life (time required to double viscosity) of 70 min. The clearcoat is applied onto aluminum or steel panels. The panels are flushed with air for 30 min., and then baked for 30 min. at 130° C. The dried film has the following physical properties: cross-hatch adhesion: 5; pencil hardness: H; impact resistance, direct: 32 in./lb.; impact resistance, reverse:<8 in./lb.; gloss (aluminum panels): 20°: 110; 60°: 124.

COMPARATIVE EXAMPLE 7

Attempted Preparation of a Two-Component Polyurethane Clear Coating

Part A consists of a mixture of the "SAA 100" copolymer of Comparative Example 2 (790 g of 70% solution in propylene glycol methyl ether acetate), methyl isobutyl ketone (75 g), BYK 300 flow aid (1.71 g), and METACURE T-120 catalyst (0.85 g). Part of this mixture (100 g) is diluted with more methyl isobutyl ketone (40 g), and this solution is then mixed with Part B, which is AIRTHANE ASN-540M NCO-terminated polyester prepolymer (156 g).

The clearcoat solution turns cloudy and phase separates immediately after Parts A and B are mixed. This mixture is not suitable for making a coating.

Example 6 and Comparative Example 7 show that SAA resinous polyols made by the process of the invention can give excellent coatings in a two-component polyurethane coating formulation, while commercially available SAA resins such as "SAA 100" resinous polyol may not always be compatible.

The preceding examples are meant only as illustrations; the following claims define the scope of the invention.

TABLE 1

Preparation of Styrene-Allyl Alcohol Copolymers: Effect of Product Hydroxyl Number and Gradual Addition of Free-Radical Initiator on Polymer Yield

| Ex # | Initiator | Gradual addition? | Rxn Temp. (°C.) | Target OH # | Actual OH # | Target Mn | Actual Mn | % Yield |
|---|---|---|---|---|---|---|---|---|
| 1 | DTBP | Yes | 145 | 125 mg KOH/g (50–150 range) | 124 | 3500 | 3400 | 67 |
| C2 | DTBP | Yes | 145 | "SAA 100" | 199 | "SAA 100" | 1500 | 40 |
| C3 | DTBP | No | 135 | product, OH# 200 mg KOH/g | 195 | product, Mn = 1500 | 1430 | 30 |
| C4 | DTBP | Yes | 145 | "SAA 101" product, OH# 260 mg KOH/g | 251 | "SAA 101" product, Mn = 1200 | 1100 | 30 |

C = comparative example
DTBP = di-tert-butylperoxide

I claim:

1. A process for making a styrene/allyl alcohol copolymer, said process comprising:
   a) charging a reactor with allyl alcohol, 10–30% of the total amount to be used of styrene, and 45–75% of the total amount to be used of a free-radical initiator;
   b) heating the reaction mixture at a temperature within the range of about 125° C. to about 185° C., and
   c) gradually adding to the reaction mixture, at a decreasing rate, the remaining 70–90% of styrene and 25–55% of free-radical initiator while adjusting the styrene to allyl alcohol mole ratio in a manner effective to produce a styrene/allyl alcohol copolymer having a number average molecular weight within the range of about 2000 to about 10,000 and a hydroxyl number within the range of about 50 mg KOH/g to about 150 mg KOH/g; wherein the mole ratio of styrene to allyl alcohol used in the process is within the range of about 0.6 to about 5, and the yield of the copolymer is enhanced as a result of gradual addition of the free-radical initiator.

2. The process of claim 1 wherein the reactor is initially charged with 20–25% of the total amount to be used of styrene and 60–70% of the total amount to be used of the free-radical initiator.

3. The process of claim 1 wherein the reaction mixture is heated at a temperature within the range of about 135° C. to about 165° C.

4. The process of claim 1 wherein the resulting styrene/allyl alcohol copolymer has a number average molecular weight within the range of about 2000 to about 4000 and a hydroxyl number within the range of about 105 mg KOH/g to about 145 mg KOH/g.

5. The process of claim 1 wherein the free-radical initiator is selected from the group consisting of tert-butylperoxide, tert-butylhydroperoxide, tert-butylperbenzoate, and cumene hydroperoxide.

6. The process of claim 1 wherein the free-radical initiator is used in an amount within the range of about 3 to about 15 wt. % based on the total weight of monomers.

7. The process of claim 1 wherein the mole ratio of styrene to allyl alcohol used in the process is within the range of about 0.6 to about 2.

8. The process of claim 1 wherein the mole ratio of styrene to allyl alcohol used in the process is within the range of about 0.7 to about 1.2.

9. A process for making a styrene/allyl alcohol copolymer, said process comprising:
   a) charging a reactor with allyl alcohol, 20–25% of the total amount to be used of styrene, and 60–70% of the total amount to be used of a free-radical initiator;
   b) heating the reaction mixture at a temperature within the range of about 135° C. to about 165° C., and
   c) gradually adding to the reaction mixture, at a decreasing rate, the remaining 75–80% of styrene and 30–40% of free-radical initiator while adjusting the styrene to allyl alcohol mole ratio in a manner effective to produce a styrene/allyl alcohol copolymer having a number average molecular weight within the range of about 2000 to about 4000 and a hydroxyl number within the range of about 105 mg KOH/g to about 145 mg KOH/g; wherein the mole ratio of styrene to allyl alcohol used in the process is within the range of about 0.6 to about 2, and the yield of the copolymer is enhanced as a result of gradual addition of the free-radical initiator.

10. The process of claim 9 wherein the mole ratio of styrene to allyl alcohol used in the process is within the range of about 0.7 to about 1.2.

* * * * *